W. B. PERDUE.
WELDING AND CUTTING TORCH.
APPLICATION FILED AUG. 26, 1918.
1,373,829.
Patented Apr. 5, 1921.
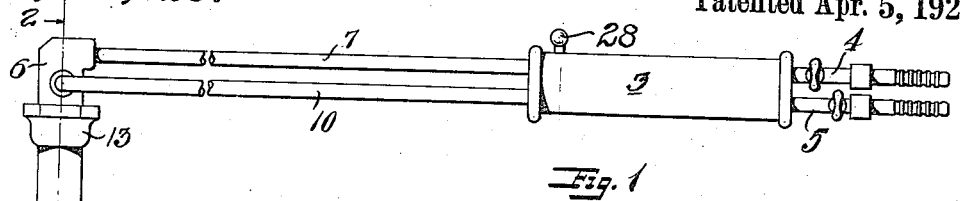
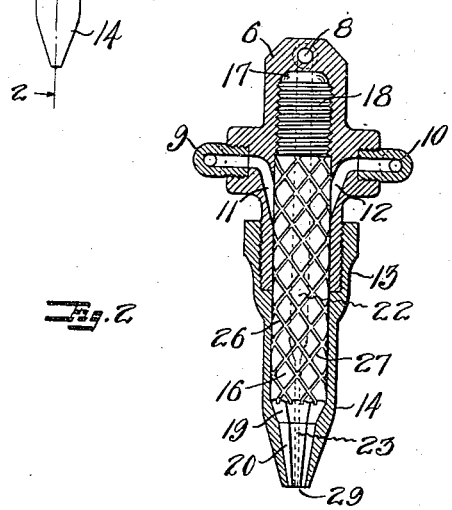
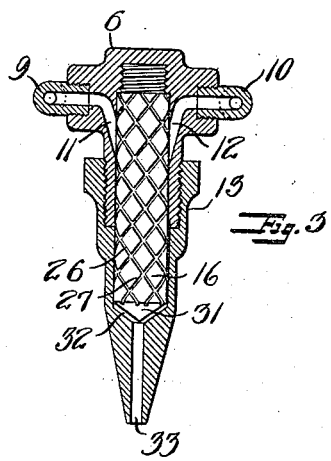
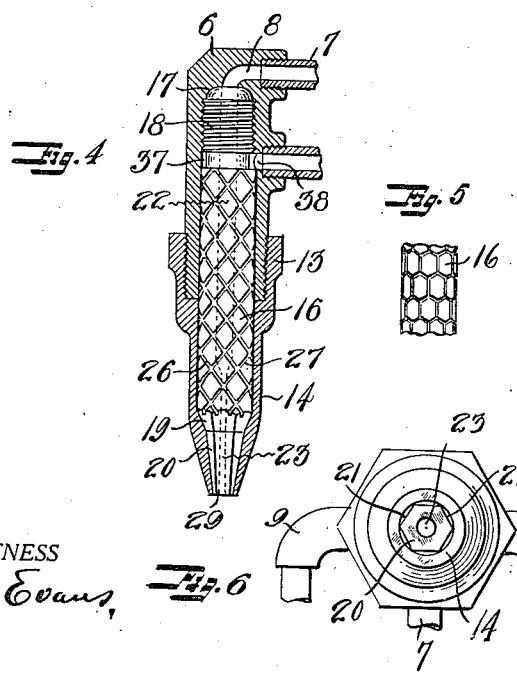
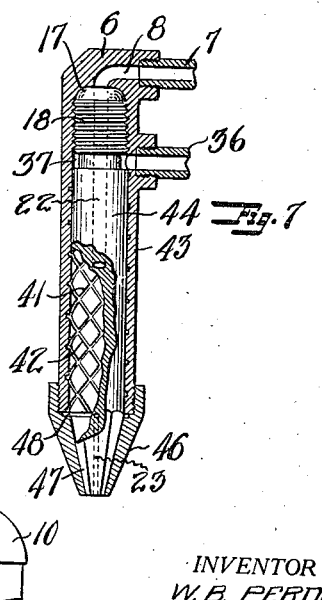
WITNESS
C. S. Evans
INVENTOR
W. B. PERDUE
BY White & Prost
HIS ATTORNEYS

UNITED STATES PATENT OFFICE.

WILLIAM B. PERDUE, OF EMERYVILLE, CALIFORNIA.

WELDING AND CUTTING TORCH.

1,373,829.　　　　Specification of Letters Patent.　　Patented Apr. 5, 1921.

Application filed August 26, 1918. Serial No. 251,368.

*To all whom it may concern:*

Be it known that I, WILLIAM B. PERDUE, a citizen of the United States, and a resident of Emeryville, county of Alameda, and State of California, have invented a new and useful Welding and Cutting Torch, of which the following is a specification.

My invention relates to welding and cutting torches.

An object of the invention is to provide a torch with improved means for mixing the gases for the heating flame.

Another object of the invention is to provide a torch such that the danger of "flash backs" is eliminated.

Another object of the invention is to provide a torch with improved means for feeding the heating flame gases upon and past the tip.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side view of a cutting torch embodying my invention.

Fig. 2 is a vertical sectional view through the head and nozzle of the torch. The plane of section is indicated by the line 2—2 of Fig. 1.

Fig. 3 is a vertical sectional view through the head and nozzle of a welding torch in accordance with my invention. Relative to the rest of the torch the plane of section is the same as that of Fig. 2.

Fig. 4 is a vertical sectional view through the head and nozzle of a modified form of cutting torch. The plane of section is coincident with the longitudinal axis of the complete torch, *i. e.*, at right angles to the plane of the section of Fig. 2.

Fig. 5 is an elevation of a fragment of a modified form of tip used in my torch.

Fig. 6 is an end view of the nozzle and tip shown in Fig. 2.

Fig. 7 is a vertical sectional view of a modified form of cutting torch.

One of the chief difficulties in designing a torch is to eliminate the tendency to "flash back." This occurs when the velocity of the mixed gases for the heating flame drops below the speed of propagation of the flame. If the torch is constructed with pockets or chambers in which considerable quantities of gas accumulate, the "flash back" will explode this gas and wreck or injure the nozzle. Another important factor in torch design is the thorough mixing of the two gases which feed the heating or welding flame. Therefore my invention includes the thorough and intimate mixing of the gases by means which does not materially retard their passage through and emission from the torch nozzle, nor permit the accumulation of the gases in pockets within the nozzle.

The torch of my invention comprises a handle 3 inclosing the gas pipes 4 and 5 which are provided with suitable nipples and valves to permit connection with and control of the gas supplies. This portion of the torch may be of any well known type and need not be described in detail herein.

A hollow torch head 6 is connected to the handle by three pipes. An oxygen pipe 7 connected into the top of the head, opens into the passage 8, which in turn opens into the top of the cylindrical chamber within the head. An oxygen pipe 9 and an acetylene pipe 10 connected to opposite sides of the head, open into passages 11 and 12 respectively. These passages convey the gases for the heating flame and are directed sharply downwardly, opening into the central chamber over a relatively large area.

The lower part of the head is formed as a threaded nipple and is adapted to receive the socket end 13 of the nozzle 14. The chamber in the nozzle is the same diameter as that in the head and forms an extension thereof. At the lower end, the nozzle chamber is constricted, preferably in two successive conical steps, to a discharge orifice.

Snugly fitting within the chamber formed by the head and nozzle casings is a tip 16. The upper end 17 of the tip is formed to seat tightly against the top of the chamber in the head 6 and threads 18 are provided for holding the tip firmly in position. The lower end of the tip is preferably formed in pyramidal steps 19 and 20 so that the edges of the pyramidal portions engage the interior conical surfaces of the end of the nozzle. If preferred a single pyramidal end may be formed on the tip, the edges engaging a single conical surface in the nozzle. It will be observed that a space or passage 21 is formed between each of the flat pyramidal surfaces and the adjacent conical surface as shown in Fig. 6. A passage 22 is formed longitudinally through the tip, the upper end alining with the passage 8, and the lower portion 23 which is preferably a constricted opening into the atmosphere upon the end of the tip adjacent to the openings of the passages 21.

Helically disposed at a rather large pitch about the surface of the tip are two series of shallow channels 26 and 27. One series corresponds in direction to a right-hand thread, and the other series to a left-hand thread, the channels of each series intersecting the channels of the other series. The channels are of such size and spacing that the passages 11 and 12 open upon two or more of each series, and preferably one channel of each series opens upon each face of the pyramidal portion 19 of the tip.

The gases for the heating flame, thus enter the head through the passages 11 and 12, and are directed downwardly into the tip channels alined therewith. The streams of gas flowing through the channels continually collide and mingle with each other. Owing to the large pitch of the helix of the channels the required velocity of the gas passing therethrough is maintained and owing to the recurrently commingling streams, a homogeneous mixture of gas is delivered from the passage 21 at the nozzle end. After the work has been brought to a sufficient heat, the valve 28 is opened to permit oxygen to flow through the passages 8 and 22. This oxygen under high pressure issues as a jet from the orifice 29 in the end of the tip and with the mixture of acetylene and oxygen forms the cutting flame.

In Fig. 5, I have shown a variation in the form of the channels on the tip. In this case the channels are disposed in polygonal forms about the tip.

In Fig. 3, I have shown a welding torch. The construction is similar to that already explained except that the tip is not hollow and no high-pressure oxygen passage is disposed in the head since no high-pressure oxygen jet is needed. In this construction, the point 31 of the tip is conically formed and sufficient space 32 is allowed between the cone and the inside surface of the nozzle to allow the mixed gases emerging into this space from the channels to pass to the discharge orifice 33.

In Fig. 4, a modified form of my invention for use with the injector type of torch is shown. The construction of the head and tip is the same as that explained in connection with Fig. 2 except that both gases for the heating flame more or less mixed by the injector enter the head through the single pipe 36. An annular groove 37 is formed in the tip at the upper ends of the channels 26 and 27, and adjacent the gas inlet 38 to receive the imperfectly mixed heating flame gases, which then pass downwardly through the intersecting mixing channels to the discharge orifices as previously explained.

In Fig. 7, the channels 41 and 42 are disposed in the head nozzle 43 which is elongated to accommodate the entire cylindrical portion of the tip 44, the surface of which is smooth. A conically chambered nozzle 46 fits over the pyramidal end 47 of the tip and an annular chamber 48 is formed in the nozzle opposite the end of the mixing channels to insure free egress of the gases therefrom.

If desired the torch may be formed with one of the mixing channels in the nozzle, as in Fig. 4, and the other in the tip as in Fig. 7. In either case the channels are formed between the two members.

I claim:

1. In a torch, a mixing tip provided with intersecting channels whereby the gases to be mixed flow therethrough in recurrently commingling streams and having a pyramidal end upon the lateral surfaces of which said channels open, and a casing inclosing said tip and provided with an apertured conical end for seating the pyramidal end of said tip.

2. In a torch, a mixing tip provided with intersecting channels whereby the gases to be mixed flow therethrough in recurrently commingling streams and having a tapered lower end upon the surface of which said intersecting channels open, a casing inclosing said tip and having a conical lower end between which and the tapered end of said tip a passage is formed, and having a discharge orifice at the end of said passage, and means for feeding gases to be mixed into the channels adjacent the upper end of the tip.

3. In a cutting torch, a mixing tip having intersecting channels whereby the gases to be mixed flow therethrough in recurrently commingling streams, a casing inclosing said tip and having a discharge orifice adjacent the openings of the lower ends of said intersecting channels, means for feeding gases for the heating flame into the channels adjacent the upper end of said tip, and means for introducing a cutting jet of oxygen into said heating flame.

4. In a cutting torch, a mixing tip having intersecting channels whereby the gases to be mixed flow therethrough in recurrently commingling streams and having a tapered lower end upon which said intersecting channels open and having a passage longitudinally disposed therein and opening at the point of said tapered end, a casing inclosing said tip and having a discharge orifice adjacent the openings of said channels and surrounding the tapered tip-end, means for feeding gases for the heating flame into the channels adjacent the upper end of said tip, and means for feeding oxygen under pressure into said longitudinal passage.

5. In a torch, a casing having a discharge orifice, a tip in said casing having intersecting channels opening adjacent said discharge orifice whereby the gases to be mixed flow through said channels in recurrently commingling streams to said discharge orifice, said tip having a passage therethrough opening at the end thereof adjacent said discharge orifice, means for feeding gases for the heating flame into said channels, and means for feeding gas for the cutting flame into said passage.

6. In a torch, a head, a mixing tip arranged within the head, and mixing channels formed between said head and tip and extending longitudinally therethrough whereby the gases to be mixed flow through said channels in recurrently commingling streams, the head having a nozzle with a convergent discharge mouth and the tip having a convergent end forming with the nozzle mouth an annular, convergent mixing chamber.

In testimony whereof I have hereunto set my hand at Emeryville, California, this tenth day of August, 1918.

WILLIAM B. PERDUE.

In presence of—
ROBERT M. BURNS,
DANIEL F. YAGER.